("12") United States Patent
Heisele et al.

(10) Patent No.: US 9,138,125 B2
(45) Date of Patent: Sep. 22, 2015

(54) WATER-CONDUCTING HOUSEHOLD APPLIANCE HAVING A MIXTURE STORE TO STORE WASHING LIQUID

(75) Inventors: Bernd Heisele, Sontheim (DE);
Christian Mutschler, Bachhagel (DE);
Roland Rieger, Rainau (DE)

(73) Assignee: BSH Hausgeraete GmbH, Munich (DE)

( * ) Notice: Subject to any disclaimer, the term of this patent is extended or adjusted under 35 U.S.C. 154(b) by 941 days.

(21) Appl. No.: 13/003,768

(22) PCT Filed: Jul. 15, 2009

(86) PCT No.: PCT/EP2009/059018
§ 371 (c)(1),
(2), (4) Date: Jan. 12, 2011

(87) PCT Pub. No.: WO2010/010012
PCT Pub. Date: Jan. 28, 2010

(65) Prior Publication Data
US 2011/0114140 A1    May 19, 2011

(30) Foreign Application Priority Data

Jul. 23, 2008    (DE) .......................... 10 2008 040 653

(51) Int. Cl.
*A47L 15/42*    (2006.01)
*A47L 15/00*    (2006.01)
*D06F 35/00*    (2006.01)
*D06F 39/00*    (2006.01)

(52) U.S. Cl.
CPC ......... *A47L 15/4291* (2013.01); *A47L 15/0015* (2013.01); *D06F 35/005* (2013.01); *D06F 39/006* (2013.01); *A47L 15/0057* (2013.01); *A47L 15/4221* (2013.01); *A47L 2601/02* (2013.01); *Y02B 40/54* (2013.01)

(58) Field of Classification Search
CPC ............ A47L 15/4291; A47L 15/4278; A47L 15/4221
USPC ....................................................... 134/56 D
See application file for complete search history.

(56) References Cited

U.S. PATENT DOCUMENTS

| 2,664,094 A | 12/1953 | Spragins |
| 3,279,481 A | 10/1966 | Neyhouse et al. |
| 4,624,118 A | 11/1986 | Yamakawa et al. |

(Continued)

FOREIGN PATENT DOCUMENTS

| CN | 1257689 A | 6/2000 |
| DE | 3901169 | 7/1990 |

(Continued)

OTHER PUBLICATIONS

Report of Examination Including National Search Report CN 200980128333.X.

(Continued)

*Primary Examiner* — Jason Ko
*Assistant Examiner* — Spencer Bell
(74) *Attorney, Agent, or Firm* — James E. Howard; Andre Pallapies

(57) ABSTRACT

A water-conducting household appliance having a heating element to heat washing liquid; a reservoir to store the washing liquid; and a reservoir cleaning program during which the reservoir is at least temporarily and at least partially filled with the washing liquid heated by the heating element.

24 Claims, 3 Drawing Sheets

(56) References Cited

U.S. PATENT DOCUMENTS

| | | | |
|---|---|---|---|
| 4,641,671 A * | 2/1987 | Nogi et al. | 134/57 D |
| 5,333,631 A * | 8/1994 | Kirkland et al. | 134/104.1 |
| 5,617,885 A | 4/1997 | Centis | |
| 5,829,459 A | 11/1998 | Milocco et al. | |
| 6,338,760 B1 | 1/2002 | Landaeus et al. | |
| 6,578,586 B2 | 6/2003 | Moh | |
| 2004/0103929 A1* | 6/2004 | Ha | 134/58 D |
| 2007/0068562 A1 | 3/2007 | Wetzel et al. | |
| 2007/0227560 A1* | 10/2007 | Doherty et al. | 134/25.2 |
| 2007/0251549 A1 | 11/2007 | Heiligenmann et al. | |
| 2009/0090402 A1 | 4/2009 | Tameishi et al. | |
| 2009/0283111 A1 | 11/2009 | Classen et al. | |
| 2011/0132407 A1 | 6/2011 | Fauth et al. | |

FOREIGN PATENT DOCUMENTS

| | | |
|---|---|---|
| DE | 3901169 A1 | 7/1990 |
| DE | 4004057 | 8/1991 |
| DE | 4243605 | 6/1994 |
| DE | 69802648 T2 | 8/2002 |
| DE | 102004048091 A1 | 4/2006 |
| EP | 0911439 | 4/1999 |
| FR | 2564310 A1 | 11/1985 |

OTHER PUBLICATIONS

National Search Report CN 200980132660.2 dated Oct. 12, 2012, with English translation.
Report of Examination CN 200980132660.2 dated Nov. 2, 2012, with English translation.

* cited by examiner

WATER-CONDUCTING HOUSEHOLD APPLIANCE HAVING A MIXTURE STORE TO STORE WASHING LIQUID

BACKGROUND OF THE INVENTION

The invention relates to a water-conducting household appliance, in particular a dishwasher or washing machine.

A reduction in water and energy consumption is of great importance for water-conducting household appliances. Therefore, energy reduction can be achieved, for example, by reducing the process temperatures. The use of a so-called mixture store can result in water reduction. To this end, for example in the case of a dishwasher, rinsing water from one wash cycle is deposited in the mixture store until the next wash cycle and is used for prewashing the items to be washed in the dishwasher.

A dishwasher with a control device which controls a wash cycle with a number of subprogram steps is known from WO 2005/063109 A1. After performing one of the subprogram steps, for instance the rinsing step, the washing liquid no longer required is stored temporarily in the mixture store, or generally in a reservoir, and reused in a subsequent subprogram step, e.g. prewashing.

In the course of the wash cycles, the mixture store becomes greasy. The additional reduction of process temperatures during the wash cycles furthermore results in greasy films of dirt collecting in the filter and sump area of a water-conducting household appliance.

BRIEF SUMMARY OF THE INVENTION

The object of the invention is to provide a water-conducting household appliance, in particular a dishwasher or washing machine, in which such soiling or grease deposits can be removed using the least amount of energy possible.

The invention is based on a water-conducting household appliance, in particular a dishwasher or washing machine, at least comprising a heating element for heating washing liquid and a reservoir for storing washing liquid.

According to the invention, a reservoir cleaning program is provided in which the reservoir is at least temporarily and at least partially filled with washing liquid heated by the heating element. When the cleaning program is activated, washing liquid is heated by means of a heating element for a predetermined cleaning interval and fed into the reservoir. In the cleaning program the heated washing liquid is therefore applied to the reservoir as a priority, without the heated washing liquid coming into contact with the items to be washed or emitting heat to the items to be washed. On account of the high temperatures of the washing liquid in the reservoir, grease deposits can therefore be thermally broken down and removed from the reservoir.

Preferably it is envisaged that the reservoir cleaning program is part of a washing program with cleaning effect comprising a number of subprogram steps. Such washing programs for cleaning items to be washed may comprise the following subprogram steps: a prewashing step to remove heavy soiling, in which wash liquor is not usually heated, a cleaning step with the addition of detergent and heating of washing liquid to, for instance, 65° C., an intermediate washing step, usually without heating of wash liquor, a rinsing step with the addition of rinse-aid and heating of washing liquid to, for instance, 70° C., as well as a final drying step to dry the items to be washed. Notwithstanding this, in washing programs, for example, the prewashing step and/or the intermediate washing step can be cut out or related to heating of wash liquor. The reservoir cleaning program can be provided between two subprogram steps, before the first or after the last subprogram step.

It is furthermore preferably envisaged that the reservoir cleaning program can be switched on or off for at least one washing program. Switching on and/or off can be done manually by an operator, for example, using the selection switch provided for this purpose, or take place automatically, for example, after a predefined number of washing programs or on detection of soiling by means of sensors. In addition, it may be envisaged that the number of selected washing programs at a raised temperature in the cleaning step, at for example at least 55° C., is recorded and the reservoir cleaning program then cut off automatically.

Furthermore, it is preferably envisaged that the reservoir cleaning program can be selected independently of other washing programs with cleaning effect so that if need be, the reservoir cleaning program can be operated alone, in other words not in connection with a washing program, in order for example to remove particularly heavy grease deposits which render normal operation with cleaning performance impossible.

In a preferred embodiment it is envisaged that after completion of the reservoir cleaning program the reservoir is emptied again so that soiling is removed from the reservoir.

In a further, preferred embodiment it is envisaged that the washing liquid fed into the reservoir during cleaning of the reservoir is heated to a temperature in the order of 60 to 75° C., as a result of which grease deposits can be thermally broken down and removed from the reservoir.

To increase cleaning efficiency it is preferably envisaged that at least temporarily during the reservoir cleaning program washing liquid flows through the reservoir, in particular that washing liquid flows from an inlet opening to an outlet opening. The flow rate can be selected here such that the dirt particles adhering to the inside wall of the reservoir can be swept away by the liquid flow. Preferred flow rates in the reservoir are 20 to 30 l/min.

To further increase cleaning efficiency, additional flow guide elements, such as for example, flow ribs, can be provided in the reservoir, as a result of which a turbulent flow advantageous for cleaning is produced in the reservoir.

Preferably it is envisaged that at least temporarily during the reservoir cleaning program the reservoir is fluidically connected, in particular, via an outlet opening, to a dishwasher interior of a washing container of the household appliance. Thus, the washing liquid can flow through the reservoir during cleaning of the reservoir and washing liquid be fed via an outlet opening into the washing container. The outlet opening of the reservoir can be connected to the washing container via an additional, e.g. external return pipe which can discharge into the dishwasher interior of the washing container of the dishwasher.

To this end preferably at least temporarily during the reservoir cleaning program the outlet opening of the reservoir is connected to the washing container via a return pipe.

In a further preferred embodiment it is envisaged that the outlet opening is a ventilation opening of the reservoir which flows directly into the dishwasher interior of the washing container. A particularly simple design is thus possible.

Furthermore, it is preferably envisaged that after performance of one of the subprogram steps, in particular a rinsing step, the washing liquid no longer required is stored temporarily in the reservoir. In this way water can be saved by reusing washing liquid.

In addition, it is preferably envisaged that in a first circulation loop to perform the wash cycle at least one spray device is integrated to apply washing liquid to the items to be washed.

Further it is preferably envisaged that at least temporarily during the reservoir cleaning program washing liquid circulates in a second circulation loop in which the washing liquid can be fed past the items to be washed, in particular from a sump area of the washing container via a circulation line to the reservoir and back again into the sump area. Therefore besides the first circulation loop for cleaning items to be washed, a second circulation loop is provided which serves only to clean the reservoir and thus permits particularly high energy savings when cleaning the reservoir as no items to be washed are heated.

It is preferably envisaged that the second circulation loop has a bypass to reduce the volume of washing liquid flowing through the reservoir. Alternatively the performance of the circulation pump may also be reduced, in particular to the extent that essentially no washing liquid leaks from the spray devices and consequently no washing liquor is applied to the items to be washed. Further, in parallel the heating capacity of the continuous-flow heater can be reduced when the flow rate is reduced.

It is preferably envisaged that at least temporarily during the reservoir cleaning program washing liquid flows along a side wall of the washing container into the sump. This ensures that items to be washed arranged in dish racks are also not heated up as a result of washing liquid applied to the items to be washed and a reservoir cleaning program with particularly high energy savings is thus provided.

It is preferably envisaged that the first circulation loop is partially or completely interrupted during the reservoir cleaning program, and washing liquid flows into the reservoir. The washing liquid circulated in the first circulation loop can then be fed into the reservoir instead of this. In this way, the same volume of washing liquid can be used both during the normal wash cycle and during the cleaning interval, in which the reservoir is cleaned.

It is particularly preferable if the cleaning interval is started during, in particular at the start of, the cleaning step of the wash cycle, as in this case the washing liquid is used both at a high temperature as well as with the addition of a detergent.

Further it is preferably envisaged that the reservoir cleaning program is provided before a cleaning step of a washing program of the wash cycle, in which the washing liquid, heated in particular to 55 to 65° C., is applied to items to be washed. This is a reservoir cleaning program with particularly high energy savings in which the washing container is preheated by the reservoir cleaning program so that a mixing temperature is produced after renewed filling with washing liquid.

It is preferably envisaged that the cleaning step of the washing program has a refilling step in which the volume of washing liquid is increased. This can be done, for example, by adding fresh water from a building supply main or from an additional liquid reservoir of the water-conducting household appliance, for example, a volume of 1 liter being refilled.

Finally it is preferably envisaged that during the reservoir cleaning program, washing liquid with a flow rate in the order of 20 to 30 l/min flows through the reservoir to ensure the effective removal of grease deposits.

BRIEF DESCRIPTION OF THE DRAWINGS

There follows an exemplary embodiment of the invention based on the appended figures.

The figures show.

DETAILED DESCRIPTION OF EXEMPLARY EMBODIMENTS OF THE PRESENT INVENTION

Figure 1:
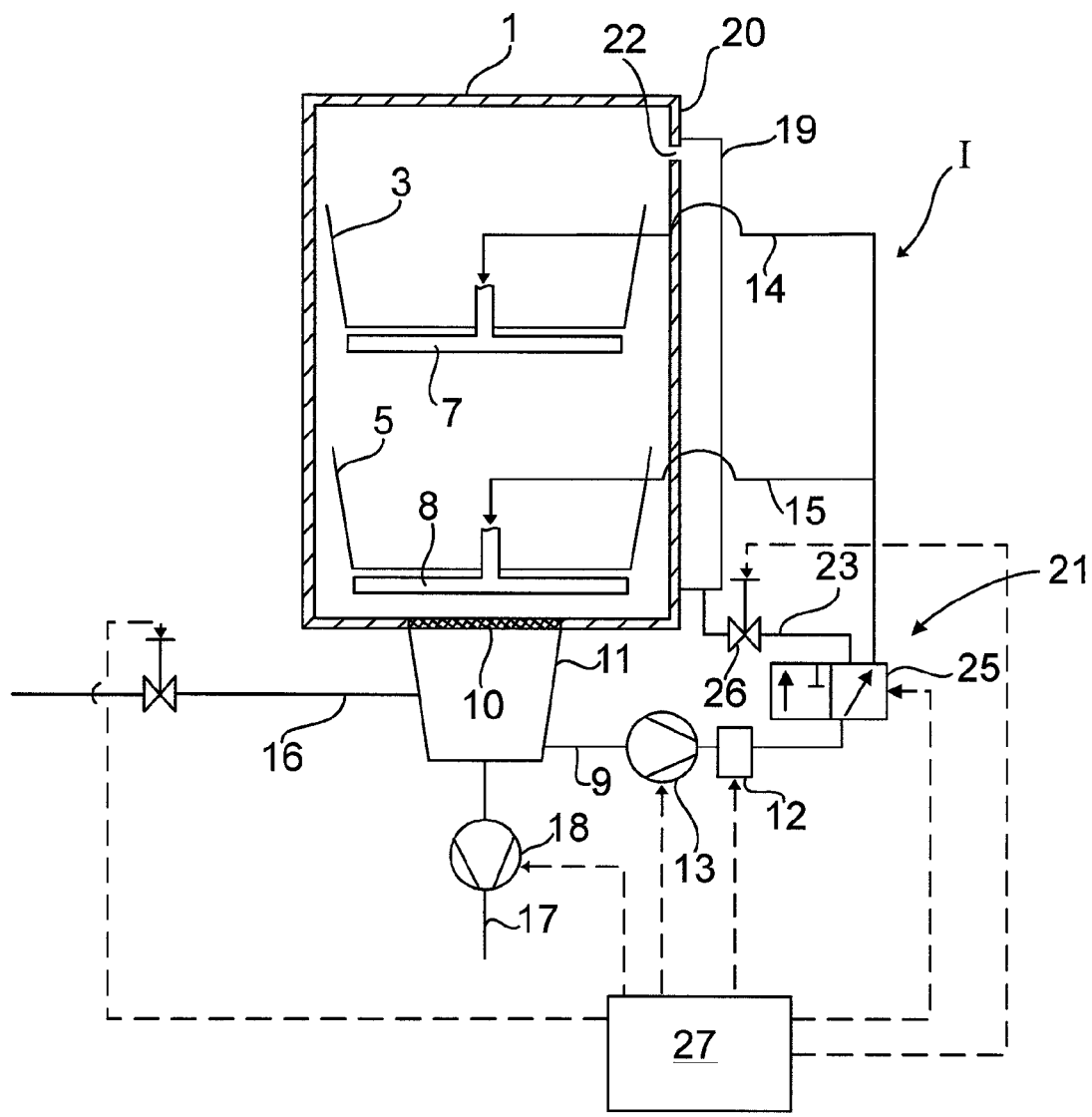
FIG. 1 in a schematic block diagram a dishwasher for performance of the washing method according to the invention.

FIG. 1 is a schematic illustration of a dishwasher as an exemplary embodiment of water-conducting household appliances with a washing container 1 adjacent to a dishwasher interior. In the dishwasher interior of the washing container 1 soiled items to be cleaned, not shown, can be arranged in dish racks 3, 5. In the washing container 1 shown, for example, two spray arms 7, 8 on different spray planes are arranged, via which washing liquid is applied to the items to be washed. In the washing container base there is a sump 11 with an only approximately indicated filter arrangement 10. A circulation line 9 with a circulation pump 13 arranged therein is guided away from the sump 11. The circulation line 9 is fluidically connected to the spray arms 7, 8 via supply lines 14, 15. Downstream of the circulation pump 13 is a heating element described as a water heater, for instance a continuous-flow heater.

Furthermore, the sump 11 is connected via connecting studs to a fresh-water supply line 16 connected to the water supply mains and to a drain line 17 in which a drain pump 18 is arranged for pumping washing liquid out of the washing container 1. The washing container 1 has a so-called mixture store on its right side in FIG. 1 as a reservoir 19, which in the manner of a heat exchanger is thermally linked to a side wall 20 of the reservoir 1. In the mixture store 19 washing liquid which is no longer required after performance of a subprogram step of a wash cycle can be stored temporarily. The upper area of the mixture store 19 is fluidically connected to the dishwasher interior via a ventilation opening 22.

In a first traditional circulation loop I of the dishwasher for performance of subprogram steps of the wash cycle described later, among other things, the sump 11 is integrated with an assigned filter arrangement 10, the circulation line 9, the supply lines 14, 15 and the two spray arms 7, 8.

In contrast, the mixture store 19 is not integrated into the first hydraulic circuit I. Rather, downstream of the heating element 12 in the circulation line 9 a branching point 21 is provided at which a connecting line 23 branches off, which is connected to an inlet opening of the mixture store 19. At the branching point 21 there is an alternative water distributor designed as a three-way control valve 25. In a switch position shown in FIG. 2, the three-way control valve 25 connects the circulation line 9 to the connecting line 23 leading to the mixture store 19 and interrupts the flow path to the supply lines 14, 15.

Figure 2:
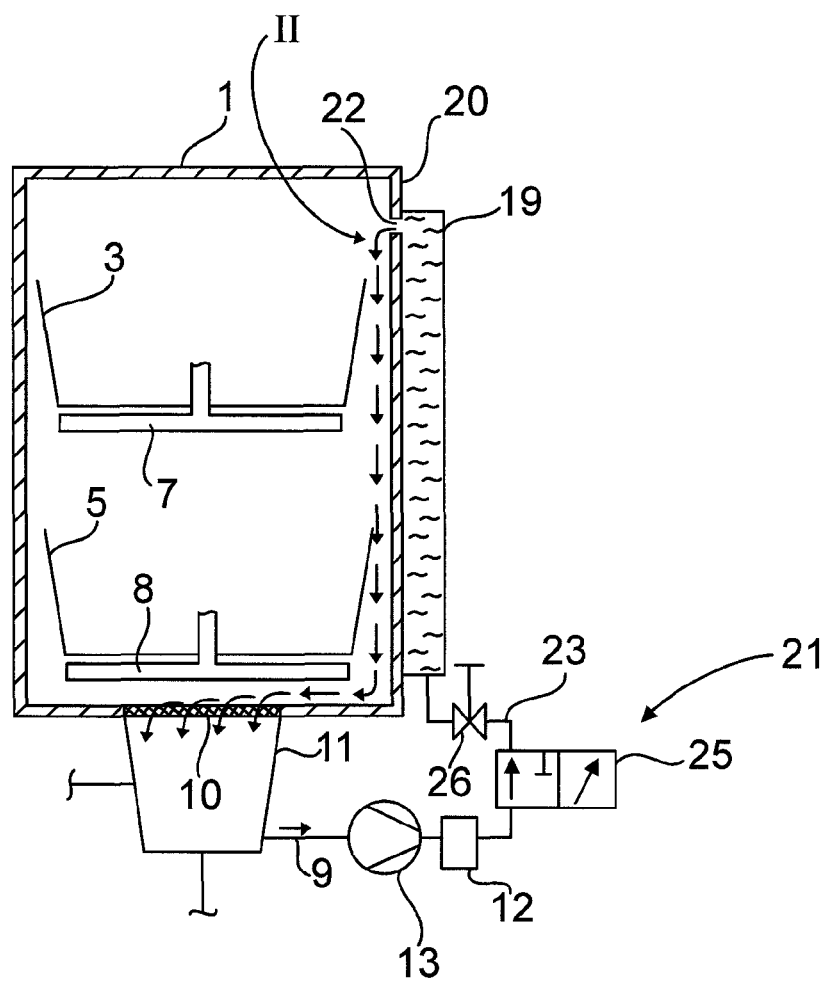
FIG. 2 a view corresponding to FIG. 1 with activated second circulation loop for reservoir cleaning.

In contrast, in the switch position of the three-way control valve 25 shown in FIG. 1 the connection to the mixture store 19 is interrupted and the circulation line 9 connected to the supply lines 14, 15. In this switch position of the three-way control valve 25 the washing liquid can therefore be circulated in the first circulation loop I of the dishwasher. In contrast, in the second circulation loop II as per FIG. 2 the washing liquid can be pumped into the mixture store 19 via the inlet opening not shown in detail and fill this until the washing liquid enters the washing container 1 via the ventilation opening 22 and is returned along the washing container wall 20 past the dish racks 3, 5 back into the sump 11 with assigned filter arrangement 10. Depending on the switch position of the three-way control valve 25, the washing liquid can therefore be circulated either in the first circulation loop I (FIG. 1) or in the second circulation loop II (FIG. 2).

In the connecting line 23 leading to the mixture store 19 furthermore a check valve 26 is arranged which during the second circulation loop II is arranged in its open position.

Figure 3:
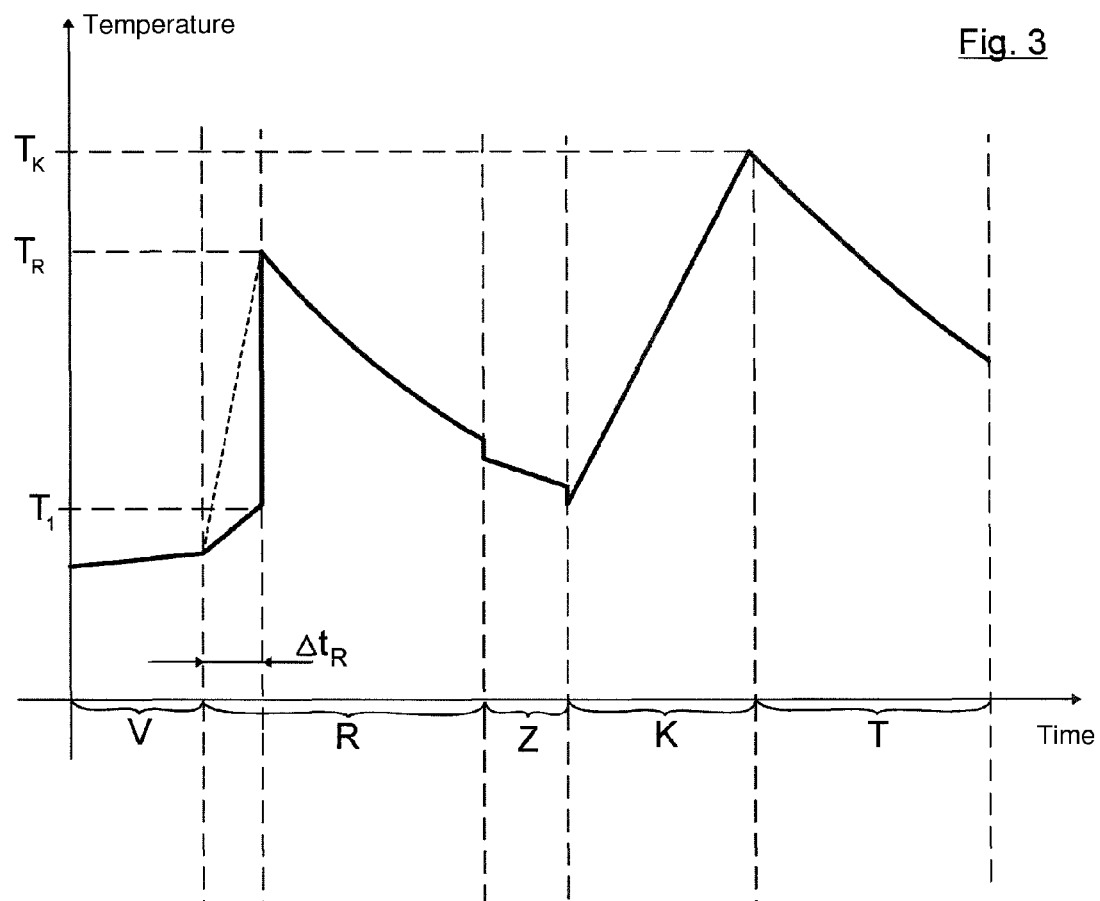
FIG. 3 a temperature-time diagram relating to the dishwasher interior of the dishwasher.

In FIG. 3 a washing program sequence of the dishwasher is shown on the basis of a temperature-time diagram.

The temperature-time diagram of FIG. 3 concerns the temporal progression of a mixing temperature which is produced by the temperatures of the washing liquid found in the dishwasher interior, the washing container temperature and the temperature of the items to be washed. In contrast, the temperature-time diagram shown in FIG. 4 concerns a mixing temperature which is produced on the basis of the temperatures of the mixture store 19 linked thermally to the washing container 1 and if applicable, a washing liquid in the mixture store 19.

Figure 4:
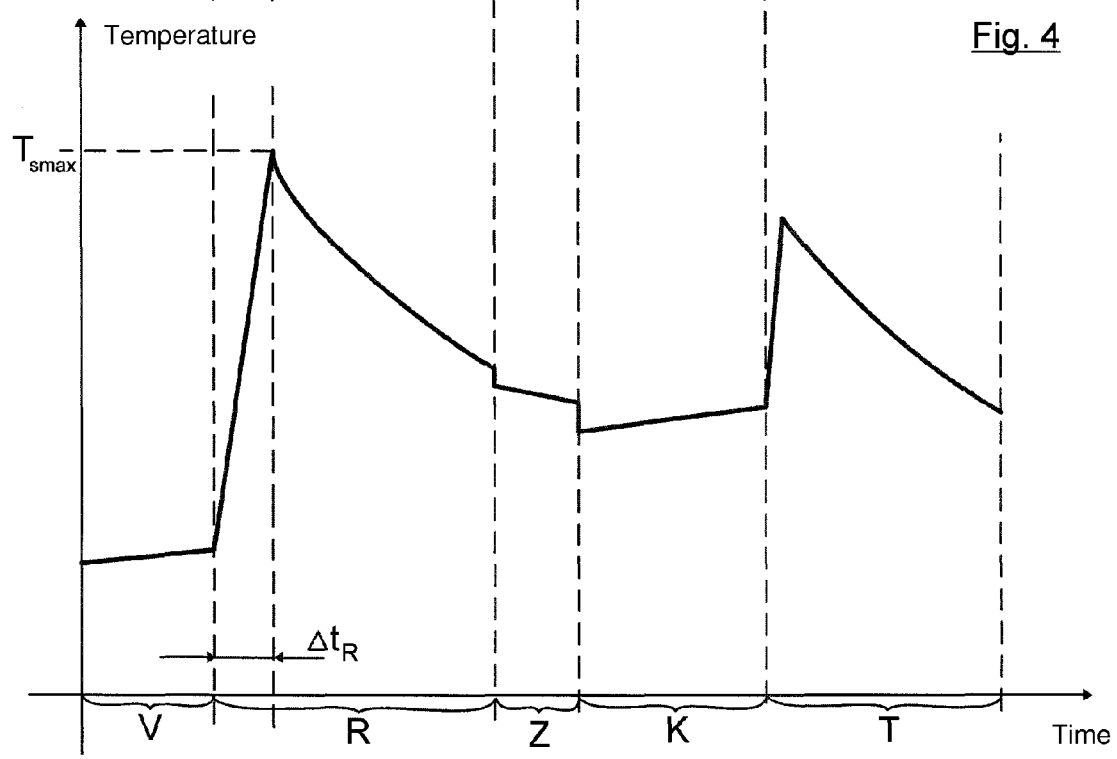
FIG. 4 a temperature-time diagram corresponding to FIG. 3 and relating to the reservoir of the dishwasher.

The program sequence illustrated in accordance with FIGS. 3 and 4 shows the individual subprogram steps of a wash cycle, namely prewashing V, cleaning R, intermediate washing Z, rinsing K and drying T. These subprogram steps are carried out by means of a control device 27 through corresponding addressing of the device components.

The wash cycle is started with the prewashing step V, in which a volume of rinsing water stored temporarily in the mixture store 19 from the previous wash cycle is run into the sump area of the washing container 1. The check valve 26 is opened for this purpose and the three-way valve 25 is moved to the position shown in FIG. 2. The volume of rinsing water stored temporarily can therefore flow into the sump area of the washing container 1 by force of gravity. Finally the three-way control valve 25 is moved into its switch position shown in FIG. 1 and the circulation pump 13 started, as a result of which the rinsing water can circulate in the first circulation loop I. After performance of the prewashing step V, the washing liquid used is pumped away by means of the drain pump 18 and then fresh water is supplied to the sump area for the following cleaning step R.

Before the cleaning step R the reservoir cleaning program is performed in which the mixture store 19 is cleaned with the washing liquid necessary for the cleaning step R. During the reservoir cleaning program the three-way control valve 25 is in the switch position shown in FIG. 2 and the check valve 26 is open. Accordingly, the first circulation loop I for application of the washing liquid to the items to be washed is interrupted. The washing liquid is instead circulated by means of the circulation pump 13 in the second circulation loop II, in which the washing liquid flows through the mixture store 19 at a high flow rate and back into the sump area via the ventilation opening 22 along the washing container side wall 20.

At the same time in the second circulation loop the washing liquid is heated to temperatures in the order of 70° C., as a result of which dirt particles in the circulation loop II, in other words in particular in the mixture store 19 and in the sump 11 and the assigned filter arrangement 10, are loosened and can be removed. Accordingly, as per the diagram in FIG. 2 during the reservoir cleaning program the temperature $T_S$ increases in the mixture store 19 to approx. 70° C. The items to be washed and the washing container 1 are therefore not or hardly heated in the second circulation loop II—with the exception of the washing container side wall 20. On account of thermal coupling with the mixture store 19, the dishwasher interior only heats up slightly to a temperature $T_1$ as shown in FIG. 3.

After the end of the reservoir cleaning program the first hydraulic circuit I is put into operation. This means that in the following cleaning step the three-way control valve 25 is put into the switch position shown in FIG. 1, in which the washing liquid heated to 70° C. is applied to the items to be washed via the supply lines 14, 15 and the spray arms 7, 8 connected to them. On account of the washing liquid now circulating in the first hydraulic circuit I, a cleaning temperature $T_R$ of approx. 50° C. now develops in the dishwasher interior. The washing liquid must be heated for this purpose during mixture store cleaning so that after switching to the first circulation loop I a cleaning temperature in the order of 50 to 55° C. is produced in the dishwasher interior.

After performance of the cleaning step R the washing liquid no longer required is pumped away and fresh water is supplied for the following intermediate washing step Z, and after performance of the intermediate washing step Z is also pumped away again.

For the subsequent rinsing step K, fresh water is again supplied and heated to a rinsing temperature $T_K$. At the end of the rinsing step the heated washing liquid is pumped out of the washing container, whereupon the drying step T begins.

In the drying step T, the items to be washed dry on account of their own heat in accordance with the known condensation principle, in which the moisture-laden air can condense on the side walls of the washing container 1. The washing liquid no longer required after performance of the rinsing step K is not fed into the drainage system but is stored temporarily in the mixture store 19. The washing liquid stored temporarily can then be used in the next wash cycle in prewashing step V.

LIST OF REFERENCE CHARACTERS

1 Washing container
3 Dish rack
5 Dish rack
7, 8 Spray arm
9 Circulation line
10 Filter arrangement
11 Sump
12 Heating element
13 Circulation pump
14 Supply line
15 Supply line
16 Fresh water supply line
17 Drainage line
18 Drain pump
19 Storage container
20 Storage container side wall
21 Branching point
22 Outlet opening
23 Connecting line
25 Three-way control valve
27 Control device
V Prewashing
R Cleaning
Z Intermediate washing
K Rinsing
T Drying
$T_S$, $T_{smax}$ Mixture store temperature
$T_R$ Cleaning temperature
$\Delta t_R$ Cleaning interval
I First circulation loop
II Second circulation loop

The invention claimed is:

1. A water-conducting household appliance, comprising:
   a circulation circuit to circulate washing liquid in the water-conducting household appliance, the circulation circuit having:
   a washing container having a top wall, a bottom wall, and a side wall, the washing container defining an interior to receive items to be washed with the washing liquid during a washing program;
   a heater configured to heat the washing liquid circulated in the water-conducting household appliance;
   a sump structured to collect the washing liquid released into the washing container;
   at least one spray device positioned in the interior of the washing container;
   a mixture store structured to store the washing liquid, the mixture store having an outlet opening disposed on the side wall of the washing container above the sump, and the mixture store being fluidly connected to the interior directly through the side wall of the washing container via the outlet opening to release the washing liquid stored in the mixture store directly into the washing container a n d along the side wall of the washing container;
   a circulation pump configured to pump the washing liquid to the mixture store or the at least one spray device;
   a control valve positioned downstream of the circulation pump;
   a control device configured to execute the washing program and control the circulation pump, the heater, and the control valve;
   a connecting line fluidly joining the control valve to the mixture store; and
   at least one supply line corresponding to each at least one spray device and fluidly joining the control valve to each at least one spray device,
   wherein the control valve is configured to direct the washing liquid pumped by the pump through a first circulation loop that includes each at least one spray device and the at least one supply line such that the washing liquid enters the interior via each at least one spray device or a second circulation loop that includes the mixture store and the connecting line such that the washing liquid enters the interior via the outlet opening.

2. The water-conducting household appliance of claim 1, wherein the outlet opening is positioned at an upper region of the mixture store.

3. The water-conducting household appliance of claim 1, wherein the water-conducting household appliance is one of a dishwasher and a washing machine.

4. The water-conducting household appliance of claim 1, wherein the control device is configured to execute a mixture store cleaning program to activate circulation of the washing liquid in the circulation circuit;
   wherein the mixture store cleaning program is part of the washing program; and
   wherein the washing program has a plurality of subprogram steps.

5. The water-conducting household appliance of claim 4, wherein the mixture store cleaning program is one of switched on and switched off during the washing program.

6. The water-conducting household appliance of claim 4, wherein the mixture store cleaning program is selectable independently of other washing programs.

7. The water-conducting household appliance of claim 4, further comprising a drain pump and a drain line,
   wherein the control device is configured to operate the drain pump to empty the mixture store via the drain line after completion of the mixture store cleaning program.

8. The water-conducting household appliance of claim 4, wherein, during execution of the mixture store cleaning program, the control device is configured to operate the heater and the circulation pump such that the washing liquid in the mixture store has at least temporarily reached a temperature of 60° C. to 75° C.

9. The water-conducting household appliance of claim 4, wherein, at least temporarily during the mixture store cleaning program, the control device is configured to operate the control valve and the circulation pump such that the washing liquid flows along the side wall of the washing container into the sump.

10. The water-conducting household appliance of claim 4, wherein, during the mixture store cleaning program, the control device is configured to operate the control valve and the circulation pump such the first circulation loop is one of partially and fully interrupted, and wherein the washing liquid flows into the mixture store and does not flow through the at least one spray device.

11. The water-conducting household appliance of claim 4, wherein, during the mixture store cleaning program, the control device is configure to operate the control valve and the circulation pump such that the washing liquid flows through the mixture store with a flow rate in the order of 20 1/min to 30 1/min.

12. The water-conducting household appliance of claim 4, wherein, at least temporarily during execution of the mixture store cleaning program, the control device is configured to operate the circulation pump such that the washing liquid flows through the mixture store.

13. The water-conducting household appliance of claim 12, wherein, at least temporarily execution of the mixture store cleaning program, the control device is configured to operate the circulation pump such that the washing liquid flows from an inlet opening of the mixture store to the outlet opening of the mixture store.

14. The water-conducting household appliance of claim 4, wherein, at least temporarily during the mixture store cleaning program, the mixture store is fluidly connected to the interior of the washing container of the water-conducting household appliance.

15. The water-conducting household appliance of claim 14, further comprising a return pipe,
   wherein, at least temporarily during the mixture store cleaning program, the outlet opening of the mixture store is connected to the washing container via the return pipe.

16. The water-conducting household appliance of claim 14, wherein the outlet opening is a ventilation opening of the mixture store.

17. The water-conducting household appliance of claim 4, wherein, after performance of one of the plurality of subprogram steps, the washing liquid no longer required is temporarily stored in the mixture store.

18. The water-conducting household appliance of claim 17, wherein one of the plurality of subprogram steps is a rinsing step.

19. The water-conducting household appliance of claim 4, wherein, at least temporarily during the mixture store cleaning program, the control device is configured to operate control valve and the circulation pump such that the washing liquid circulates through the mixture store in the second circulation loop, in which the washing liquid is fed past the items to be washed.

20. The water-conducting household appliance of claim 19, wherein the control device is configured to operate the control valve and the circulation pump such that the washing liquid circulates from a sump area of the washing container via a circulation line to the mixture store and back into the sump area.

21. The water-conducting household appliance of claim 19, wherein the second circulation loop has a bypass to reduce a flow rate of the washing liquid flowing through the mixture store.

22. The water-conducting household appliance of claim 4, wherein the control device is configured to execute the mixture store cleaning program before a cleaning step of the washing program of a wash cycle, in which heated washing liquid is applied to the items to be washed.

23. The water-conducting household appliance of claim 22, wherein the control device is configured to operate the heater and the circulation pump such that the washing liquid is heated to a temperature of 55° C. to 65° C.

24. The water-conducting household appliance of claim 22, wherein the cleaning step of the washing program has a refilling step in which the control device is configured to increase a volume of the washing liquid.

* * * * *